United States Patent [19]

Regel et al.

[11] 3,818,029
[45] June 18, 1974

[54] IMIDAZOLYL-KETOXIME-CARBAMATES

[75] Inventors: Erik Regel; Karl Heinz Buchel, both of Wuppertal-Elberfeld; Ingeborg Hammann, Cologne; Gunter Unterstenhofer, Opladen, all of Germany

[73] Assignee: Bayer Aktiegesellschaft, Leverkusen, Germany

[22] Filed: Jan. 4, 1972

[21] Appl. No.: 215,437

[30] Foreign Application Priority Data

Jan. 12, 1971 Germany............................ 2101111

[52] U.S. Cl........... 260/309, 260/307 H, 260/309.2, 260/310 R, 424/272, 424/273
[51] Int. Cl............................................. C07d 49/36
[58] Field of Search........................ 260/309, 309.2

[56] References Cited
UNITED STATES PATENTS

| | | | |
|---|---|---|---|
| 3,459,764 | 8/1969 | Kollonitsch......................... | 260/309 |
| 3,565,892 | 2/1971 | Asato et al........................... | 260/309 |
| 3,634,447 | 1/1972 | Gastrock............................. | 260/309 |
| 3,646,016 | 2/1972 | Henry et al. ........................ | 260/309 |
| 3,652,555 | 3/1972 | Albright et al...................... | 260/309 |
| 3,654,299 | 4/1972 | Asato et al........................... | 260/309 |
| 3,655,688 | 4/1972 | Holan et al. ..................... | 260/309.2 |
| 3,681,476 | 8/1972 | Gutman ........................... | 260/309.2 |

FOREIGN PATENTS OR APPLICATIONS 710,649  8/1968  Belgium

*Primary Examiner*—Natalie Trousof
*Attorney, Agent, or Firm*—Burgess, Dinklage & Sprung

[57] ABSTRACT

Imidazolyl-ketoxime-carbamates of the general formula

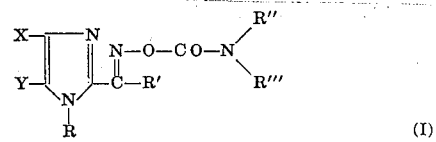

(I)

in which
X and Y each independently is hydrogen, halogen, methyl, ethyl or optionally substituted aryl, or
X and Y together constitute a $(CH)_4$ group forming a fused benzene ring with the two imidazole-ring carbon atoms to which they are attached,
R and R'' each independently is alkyl or alkenyl with up to 6 carbon atoms; or aryl or aralkyl optionally carrying at least one halogen, nitro or alkyl substituent,
R' is alkyl, haloalkyl, optionally substituted aryl or a five- or six-membered heteroaromatic ring optionally carrying at least one halogen, alkyl, aryl or substituted aryl substituent, and
R''' is hydrogen, or alkyl or alkenyl with up to four carbon atoms, which possess insecticidal, acaricidal and bactericidal properties.

7 Claims, No Drawings

IMIDAZOLYL-KETOXIME-CARBAMATES

The present invention relates to and has for its objects the provision of particular new imidazolylketoxime-carbamates, i.e. [0-(N-mono- or di-substituted-carbamoyl]-[2'-(1'-alkyl-, alkenyl-, aryl- or -aralkyl-imidazolyl)]-alkyl-, aryl- or heterocyclic-ketoximes, which possess insecticidal, and bactericidal properties, active compositions in the form of mixtures of such compounds with solid and liquid dispersible carrier vehicles, and methods for producing such compounds and for using such compounds and for using such compounds in a new way especially for combating pests, e.g., insects, acarids and bacteria, especially insects, with other and further objects becoming apparent from a study of the within specification and accompanying examples.

It is known from Belgian Pat. Specification No. 710,649 that alkylcarbamic acid esters of ketoximes have insecticidal properties. However, the activity of the known preparations at low application concentrations is not always satisfactory.

The present invention provides, as new compounds, the imidazolyl-ketoxime-carbamates of the general formula

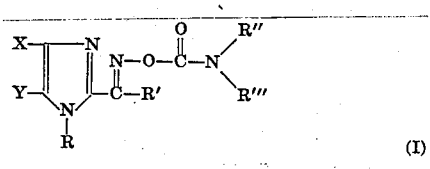

(I)

in which

X and Y each independently is hydrogen, halogen, methyl, ethyl or optionally substituted aryl, or X and Y together constitute a $(CH)_4$ group forming a fused benzene ring with the two imidazole-ring carbon atoms to which they are attached, R and R" each independently is alkyl or alkenyl with up to 6 carbon atoms; or aryl or aralkyl, optionally carrying at least one halogen, nitro or alkyl substituent, R' is alkyl, haloalkyl, optionally substituted aryl or a five- or six-membered heteroaromatic ring optionally carrying at least one halogen, alkyl, aryl or substituted aryl substituent, and R''' is hydrogen, or alkyl or alkenyl with up to four carbon atoms.

These new compounds exhibit very good insecticidal activity as well as acaricidal and bactericidal activity.

The present invention also provides a process for the preparation of an imidazolyl-ketoxime-carbamate of the formula (I) in which an imidazolyl-ketoxime of the general formula

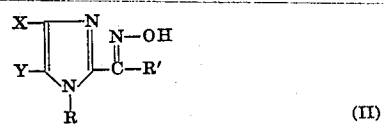

(II)

in which

X, Y, R and R' have the meanings stated above, is reacted (a) with an isocyanate of the general formula $$O=C=N-R''$$

(III)

in which

R'' has the meaning stated above, or (b) with a dialkylcarbamic acid chloride of the general formula

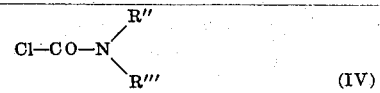

(IV)

in which

R'' and R''' have the meanings stated above.

Surprisingly, the imidazolyl-ketoxime-carbamates according to the invention show a considerably higher insecticidal activity that the alkyl-carbamic acid esters of ketoximes known from the prior art, which are the chemically closest active compounds of the same type of activity. Moreover, in their activity against resistant pests, such as *Myzus persicae*, they are superior to the known carbamate insecticides, such as 2-isopropoxy-N-methyl-carbamate. The compounds according to the invention therefore represent an enrichment of the art.

If 2-(1-methyl)-imidazolyl-4'-chlorophenyl-ketoxime and methylisocyanate are used as starting materials, the reaction course can be represented by the following equation:

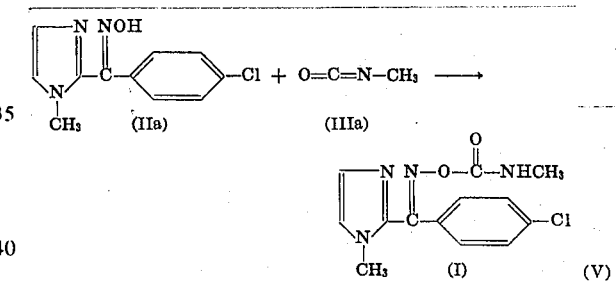

If 2-(1-methyl)-imidazolyl-2'-furyl-ketoxime and dimethylcarbamoyl chloride are used as starting materials, the reaction course can be represented by the following equation:

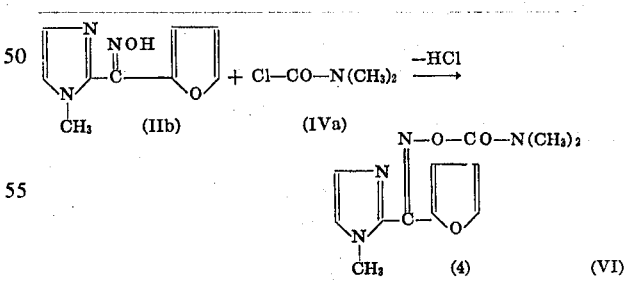

The imidazolyl-ketoximes used as starting materials are defined generally by formula (II). In formula (II), as in formula (I), X and Y are preferably each hydrogen or alkyl with up to four carbon atoms or, jointly, are a $(CH)_4$ group forming a fused benzene ring with the two imidazole-ring carbon atoms to which they are attached; R is preferably hydrogen, alkyl or alkenyl with up to four carbon atoms, benzyl or phenyl, the two last named radicals optionally being substituted one or more times, preferably by halogen and/or nitro; and R' preferably is alkyl or haloalkyl with up to six carbon atoms in either case, phenyl substituted one or more times by chlorine and/or nitro, or is a five-membered heteroaromatic ring, preferably furyl, imidazolyl, isoxazolyl, pyrazolyl or thienyl, any of these rings being preferably substituted by alkyl.

As examples of the imidazolyl-ketoximes to be used, there are mentioned in particular:

[2'-(1'-methylimidazolyl)]-phenylketoxime,
[2'-(1'-methylimidazolyl)]-4-biphenylketoxime,
[2'-(1'-methylimidazolyl)]-4-nitrophenylketoxime,
[2'-(1'-methylimidazolyl)]-3-tolylketoxime,
[2'-(1'-methylimidazolyl)]-2,4-dichlorophenylketoxime,
[2'-(1'-methylimidiazoly)]-2,5-dichlorophenylketoxime,
[2'-(1'-methylimidazolyl)]-4-chlorophenylketoxime,
[2'-(1'-methylimidazolyl)]-3-chlorophenylketoxime,
[2'-(1'-phenylimidazolyl)]-4-chlorophenylketoxime,
[2'-(1'-phenylimidazolyl)]-2-chlorophenylketoxime,
[2'-(1'-methylimidazolyl)]-2-furylketoxime,
[2'-(1'-methylimidazolyl)]-3-nitrophenylketoxime,
[2'-(1'-benzylimidazolyl)]-2-furylketoxime,
[2'-(1'-n-propylimidazolyl)]-2-furylketoxime,
[2'-(1'-benzylimidazolyl)]-4-nitrophenylketoxime,
[2'-(1'-n-propylimidazolyl)]-4-chlorophenylketoxime,
[2'-(1'-ethylimidazolyl)]-4-chlorophenylketoxime,
[2'-(1'-benzylimidazolyl)]-2-chlorophenylketoxime,
[2'-(1'-benzylimidazolyl)]-4-chlorophenylketoxime,
[2'-(1'-ethylimidazolyl)]-2-furylketoxime,
[2'-(1'-methylbenzimidazolyl)]-2-furylketoxime,
2,2'-bis(1-methylimidazolyl)-ketoxime,
[2'-(1'-methylimidazolyl)]-2-thienylketoxime,
[2'-(1'-methallylimidazolyl)]-2-furylketoxime.

The imidazolylketoximes used as starting materials have not hitherto been described in the literature, but they can be prepared by reacting imidazoles with acid chlorides according to processes known in principle (see German Published specification No. 1,926,206) and reacting the resultant imidazolyl-ketones with hydroxylamine or hydroxylammonium salts in the presence of a tertiary base, such as pyridine, likewise in a known manner.

As solvents, well dried, inert solvents are generally used: aliphatic or aromatic hydrocarbons boiling in the range of from about 60° to about 120°C, such as petroleum ether, benzene and toluene, nitriles, such as acetonitrile, lower aliphatic ketones, such as acetone, and dialkyl ethers, especially diethyl ether, are suitable. Nitromethane, dimethyl formamide and tetrahydrofurane may also be used.

The oximes of the formula (II) can, however, also be reacted in suspended form.

As acid-binding or condensation-promoting agents, alkali metal hydroxides, alkali metal carbonates, alkali metal alcoholates or organic, preferably tertiary, bases may be used: especially suitable is triethylamine.

The reaction temperatures can be varied within a fairly wide range. In general, the work is carried out at from about −20° to +150°C, preferably at from about 0° to 50°C.

When carrying out the process according to the invention, equimolar amounts of ketoxime and isocyanate or carbamoyl chloride are conveniently used. The use of amounts up to 50 mole per cent more or less than the stoichiometric proportions does not, however, bring any significant diminution of yield.

As with other oxime derivatives (see J. Waser and W. H. Watson, Nature, 1963, 198, 1297) the oxime derivatives of the formula (I) may be present in two geometric configurations, the syn- and the anti-form. The compounds of the formula (I) are present, it is thought, in the thermodynamically more stable form.

As examples of the active compounds according to the invention, there are mentioned in particular:

[0-(N-methylcarbamoyl)]-[2'-(1'-methyl-imidazolyl]-phenyl-ketoxime,
[0-(N-methylcarbamoyl)]-[2'-(1'methyl-imidazolyl)]-2-chlorophenyl-ketoxime,
[0-(N-methylcarbamoyl)]-[2'-(1'-methyl-imidazolyl)]-3-chlorophenyl-ketoxime,
[0-(N-methylcarbamoyl)]-[2'-methyl-imidazolyl)]-4-chlorophenyl-ketoxime,
[0-(N-methylcarbamoyl)]-[2'-(1'-ethyl-imidazolyl)]-4-chlorophenyl-ketoxime,
[0-(N-methylcarbamoyl)]-[2'-(1'-methyl-imidazolyl)]-4-nitrophenyl-ketoxime,
[0-(N-methylcarbamoyl)]-[2'-(1'-ethyl-imidazolyl)]-4-nitrophenyl-ketoxime,
[0-(N-methylcarbamoyl)]-[2'-(1'-propyl-imidazolyl)]-4-nitrophenyl-ketoxime,
[0-(N-methylcarbamoyl)]-[2'-(1'-methyl-imidazolyl)]-2-furylketoxime,
[0-(N-methylcarbamoyl)]-[2'-(1'-ethyl-imidazolyl)-2-furylketoxime,
[0-(N-methylcarbamoyl)]-[2'-(1'-propyl-imidazolyl)]-2-furylketoxime,
[0-(N-methylcarbamoyl)]-[2'-(1'-methyl-imidazolyl)]-2,4-dichlorophenyl-ketoxime,
[0-N,N-dimethylcarbamoyl)]-[2'-(1'-methyl-imidazolyl)]-2-furylketoxime,
[0-(N-methylcarbamoyl)]-2,2'-bis-(N-methyl-imidazolyl)-ketoxime,
[0-(N-methylcarbamoyl)]-[2'-(1'-methyl-imidazolyl)]-2-thienylketoxime.

As already mentioned, the substances which can be used according to the invention are distinguished by a good insecticidal activity and also possess a systemic activity. They are particularly effective against resistant pests, such as *Myzus persicae*. The active compounds according to the invention are also markedly effective against flies, beetle larvae, caterpillars, aphids, leaf bugs and cicadas, as well as against tick larvae, blowfly larvae and scab mites. Accordingly, they possess a good activity against both sucking and biting insects.

To the sucking insects contemplated herein there belong, in the main, aphids (*Aphidae*) such as the green peach aphid (*Myzus persicae*), the bean aphid (*Doralis fabae*), the bird cherry aphid (*Rhopolosiphum padi*), the pea aphid (*Macrosiphum pisi*) and the potato aphid (*Macrosiphum solanifolii*), the current gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), The Mediterranean flour moth (*Ephestia künniella*) and greater wax moth (*Galleria mellonella*); and the like.

Also to be classed with the biting insects contemplated herein are beetles (*Coleoptera*), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the nothern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, *Orthoptera*, for example the house cricket (*Acheta domesticus*); termites such as the eastern subterranean termite (*Reticulitermes flavipes*) and *Hymenoptera* such as ants, for example the garden ant (*Lasius niger*); and the like.

The *Diptera* contemplated herein comprises essentially the flies, such as the vinegar fly (*Drosophila melanogaster*), the Mediterranean fruit fly (*Ceratitis capitata*), the house fly (*Musca domestica*), the little house fly (*Fannia canicularis*) the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolygylcol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and bactericides, or rodenticides, fungicides nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplated carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an mount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g. insects, acarids and bacteria, and more particularly methods of combating insects, which comprises applying to at least one of correspondingly (a) such insects, (b) such acarids, (c) such bacteria, and (d) the corresponding habitat thereof, i.e. the locus to be protected, a correspondingly combative or toxic amount, i.e. an insecticidally, acaricidally or bactericidally effective amount of the particular active compound of the invention alone or together with a carrier vehicle as noted above. The instant formulations or compositions are applied in the usual manner, for instance by spraying, atomizing, varorizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1 a. 124.5 g (0.57 mole) of 2-(1-methylimidazolyl)-4'-chlorophenylketone, 39.6 g (0.57 mole) of hydroxylammonium chloride and 1000 ml (12.4 moles) of pyridine are heated under reflux for 15 hours. The pyridine is separated by distillation, and the residue is washed with water until salt-free. By washing with a little acetonitrile and subsequently with a little methanol, there are obtained, after drying at 50°C, 100 g (75% of theory) of pure 2-(1-methyl)-imidazolyl-4'-chlorophenyl-ketoxime of m.p. 200°C and molecular weight 235.5.

b.

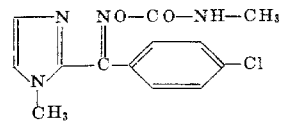

(1)

100 g (0.42 mole) of 2-(1-methyl)-imidazolyl-4'-chlorophenyl-ketoxime are suspended in 1,000 ml of acetonitrile; after addition of 23.9 g (0.42 mole) of methylisocyanate and about 1 ml of triethylamine, the reaction commences, with slight evolution of heat. After standing for 15 hours at room temperature, the reaction product is separated from the solvent by filtration. After recrystallization from acetonitrile, there are obtained 85.9 g (70 percent of theory) of pure [0-(N-methylcarbamoyl)]-[2'-(1'-methyl-imidazolyl]4-chlorophenyl-ketoxime of m.p. 180°C and molecular weight 292.5.

EXAMPLE 2 a. 141 g (0.61 mole) of 2-(1-methyl)-imidazolyl-4'-nitrophenyl-ketone, 42.4 g (0.61 mole) of hydroxylammonium chloride and 1000 ml (12.4 moles) of pyridine are heated under reflux for 15 hours. The pyridine is separated by distillation, and the residue is washed with water until salt-free. By washing with acetonitrile, there are obtained, after drying at 50°C, 96 g (64% of theory) of pure 2-(1-methyl)imidazolyl-4'-nitrophenyl-ketoxime of m.p. 280°C and molecular weight 246.

b.

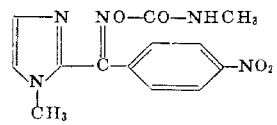

(2)

96 g (0.39 mole) of 2-(1-methyl)-imidazolyl-4'-nitrophenyl-ketoxime are suspended in 1,000 ml of acetonitrile. After addition of 22.2 g (0.39 mole) of methylisocyanate and about 1 ml of triethylamine, the reaction commences, with slight evolution of heat. After standing for 15 hours at room temperature, the reaction product is separated from the solvent by filtration. After recrystallization from ethyl acetate, there are obtained 44.5 g (38 percent of theory) of pure [0-(N-methylcarbamoyl)]-[2'-(1'-methylimidazolyl)]-4-nitrophenyl-ketoxime of m.p. 180°C and molecular weight 303.

EXAMPLE 3 a. 37.2 g (0.155 mole) of 2-(1-methyl-imidazolyl)-2'-furylketone, 11.8 g (0.55 mole) of hydroxylammonium chloride and 200 ml (2.48 moles) of pyridine are heated under reflux for 15 hours. The pyridine is separated by distillation and the residue is taken up in methylene chloride, washed with water until salt-free, dried over sodium sulfate and evaporated; the crystals obtained are triturated with acetonitrile. After drying at 50°C, there are obtained 17.4 g (59 percent of theory) of pure 2-(1methyl)-imidazolyl-2'-furylketoxime of m.p. 193°C and molecular weight 191.

b.

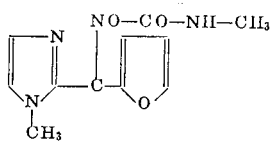

(3)

9.6 g (0.05 mole) of 2-(1-methyl)-imidazolyl-2'-furyl-ketoxime are suspended in 100 ml of acetonitrile. After addition of 2.9 g (0.05 mole) of methylisocyanate and about 0.1 ml of triethylamine, the reaction commences, with slight evolution of heat. After standing for 15 hours at room temperature, the acetonitrile is separated by distillation. The oily residue is made to crystallize by trituration with ether. There are obtained 8.4 g (68 percent of theory) of pure [0-(N-methylcarbamoyl)]-[2'-(1'-methyl-imidazolyl)]-2-furyl ketoxime of m.p. 130°C and molecular weight 248.

EXAMPLE 4

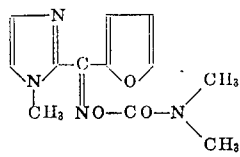

(4)

To a sodium ethylate solution, i.e. 2.3 g (0.1 mole) of sodium in 200 ml of absolute ethanol, there is added a solution of 19.1 g (0.1 mole) of 2-(1-methyl)-imidazolyl-2'-furyl-ketoxime in 600 ml of ethanol, and the reaction mixture is evaporated. The remaining crystals are dissolved in 200 ml of absolute acetonitrile, and 10.75 g (0.1 mole) of dimethylcarbamic acid chloride are added dropwise at 20°C, with ice cooling. The reaction mixture is stirred afterwards for 1 hour and the precipitated sodium chloride is filtered off. The acetonitrile is separated by distillation and the oily residue remaining is made to crystallize with ethyl acetate. After washing with a little acetonitrile and subsequent drying at 50°C, there are obtained 5.3 g of pure [0-(N-dimethylcarbamoyl)]-[2'-(1-methylimidazolyl)]-2-furylketoxime of m.p. 156°C.

EXAMPLE 5 a. 275 g (1.35 moles) of 2-(1-propyl-imidazolyl)-2'-furylketone, 80 g (1.35 moles) of hydroxylammonium chloride and 1.8 l of pyridine are heated under reflux for 60 hours. The pyridine is separated by distillation and the residue is taken up in methylene chloride, washed with water until salt-free, dried over sodium sulfate and evaporated; the crystals obtained are recrystallized from acetonitrile. After drying at 50°C, there are obtained 112 g (37.9 percent of theory) of pure 2-(1-propyl)-imidazolyl-2'-furyl-ketoxime of m.p. 148°C and molecular weight 219.

b.

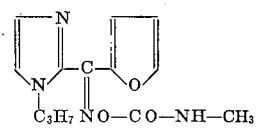

(5)

3.8 g (0.017 mole) of 2-(1-propyl)-imidazolyl-2'-furyl-ketoxime are suspended in 100 ml of acetonitrile. After addition of 1 g (0.017 mole) of methylisocyanate and three drops of triethylamine, the reaction commences, with slight evolution of heat. After standing for 15 hours at room temperature, the acetonitrile is separated by distillation. The oily residue is made to crystallize by trituration with ethyl acetate. There are obtained 3.3 g (7) percent of theory) of pure [0-(N-methylcarbamoyl)]-[2'-(1'-propyl-imidazolyl)]-2-furylketoxime of m.p. 128°C and molecular weight 276.

EXAMPLE 6 a. 23.5 g (0.124 mole) of 2,2'-bis-(N-methylimidazolyl)-ketone, 8.6 g (0.124 mole) of hydroxylammonium chloride and 300 ml of pyridine are heated under reflux for 15 hours. The pyridine is separated by distillation and the residue is washed until salt-free with water. By washing with acetonitrile there are obtained, after drying at 50°C, 16 g (63 percent of theory) of pure 2,2'-bis-(N-methyl-imidazolyl)-ketoxime of m.p. 275°C and molecular weight 205.

b.

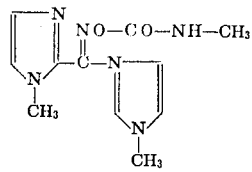

(6)

13.8 g (0.067 mole) of 2,2'-bis-(N-methyl-imidazolyl)-ketoxime are suspended in 200 ml of acetonitrile. After addition of 3.82 g (0.067 mole) of methylisocyanate and 0.5 ml of triethylamine, the reaction commences, with slight evolution of heat. After standing for 15 hours at room temperature, the acetonitrile is separated by distillation. The oily residue is made to crystallize by trituration with ether. After drying at 50°C, there are obtained 14.6 g (83 percent of theory) of pure [0-(N-methyl-carbamoyl)]-2,2'-bis-(N-methyl-imidazolyl)-ketoxime of m.p. 150°C and molecular weight 262.

EXAMPLES 7–46

In an analogous manner to that described above, the compounds identified in the following Table were obtained:

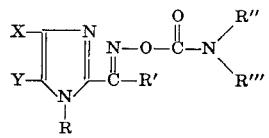

(I)

| Example | X | Y | R | R' | R'' | R''' | M.P., °C. |
|---|---|---|---|---|---|---|---|
| 7 | H | H | $CH_3$ | 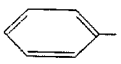 | H | $CH_3$ | 123 |
| 8 | H | H | $CH_3$ | 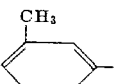 | H | $CH_3$ | 148 |
| 9 | H | H | $CH_3$ | 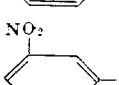 | H | $CH_3$ | 192 |
| 10 | H | H | $CH_3$ | 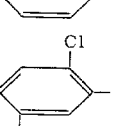 | H | $CH_3$ | 140 |
| 11 | H | H | $CH_3$ | 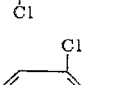 | H | $CH_3$ | 134 |
| 12 | H | H | $CH_3$ | 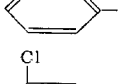 | H | $CH_3$ | 165 |
| 13 | H | H | $C_6H_5$ | 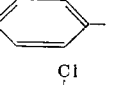 | H | $CH_3$ | 182 |
| 14 | H | H | $C_6H_5$ | 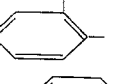 | H | $CH_3$ | 202 |
| 15 | H | H | $CH_3$ | 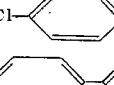 | H | $CH_3$ | 168 |
| 16 | H | H | $CH_3$ | 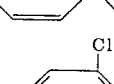 | H | $CH_3$ | 137 |
| 17 | H | H | $C_6H_5CH_2$ | 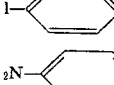 | H | $CH_3$ | 134 |
| 18 | H | H | $C_2H_5$ | Same as above | H | $CH_3$ | 120 |
| 19 | H | H | $C_3H_7$ | do | H | $CH_3$ | 129 |
| 20 | H | H | $C_3H_7$ | 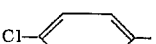 | H | $CH_3$ | 152 |
| 21 | H | H | $C_2H_5$ | Same as above | H | $CH_3$ | 158 |
| 22 | H | H | $C_6H_5CH_2$ | 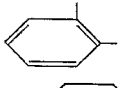 | H | $CH_3$ | 160 |
| 23 | H | H | $C_6H_5CH_2$ | 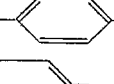 | H | $CH_3$ | 140 |
| 24 | H | H | $CH_3$ | 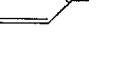 | H | 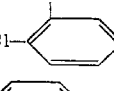 | 205 |
| 25 | H | H | $CH_3$ | Same as above | H | 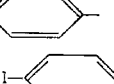 | 148 |
| 26 | H | H | $CH_3$ | do | H | 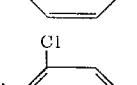 | 182 |
| 27 | H | H | $CH_3$ | 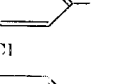 | H | 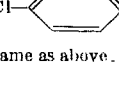 | 210 |
| 28 | H | H | $CH_3$ | 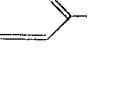 | H | Same as above | 202 |

| Example | X | Y | R | R' | R'' | R''' | M.P., °C. |
|---|---|---|---|---|---|---|---|
| 29 | H | H | CH₃ | 3-NO₂-phenyl | H | 4-Cl-phenyl | 198 |
| 30 | H | H | CH₃ | 2,4-diCl-phenyl | H | Same as above | 229 |
| 31 | H | H | CH₃ | Same as above | H | 3,4-diCl-phenyl | 210 |
| 32 | H | H | CH₃ | 2-Cl-phenyl | H | Same as above | 368 / 208 |
| 33 | H | H | C₂H₅ | 2-furyl | H | CH₃ | 130 |
| 34 | H | H | C₆H₅CH₂ | Same as above | H | CH₃ | 140 |
| 35 | H | H | CH(CH₃)CH=CH₂ | ...do... | H | CH₃ | 118 |
| 36 | H | H | CH₃ | ...do... | H | 3,4-diCl-phenyl | 195 |
| 37 | H | H | CH₃ | ...do... | H | C₂H₅ | 192 |
| 38 | H | H | CH₃ | ...do... | H | C₃H₇ | 155 |
| 39 | H | H | C₄H₉ | ...do... | H | CH₃ | 140 |
| 40 | H | H | CH₃ | 3-methylisoxazol-5-yl | H | CH₃ | 172 |
| 41 | H | H | CH₃ | CF₃ | H | CH₃ | 150 |
| 42 | H | H | CH₃ | 4-Cl-phenyl | CH₃ | CH₃ | 160 |
| 43 | H | H | CH₃ | biphenyl | CH₃ | CH₃ | 134 |
| 44 | H | H | CH₃ | pyridyl | CH₃ | CH₃ | 140 |
| 45 | H | H | C₃H₇ | 2-furyl | CH₃ | CH₃ | 136 |
| 46 | CH=CH—CH=CH | | CH₃ | Same as above | H | CH₃ | 160 |
| 47 | H | CH₃ | CH₃ | 4-Cl-phenyl | H | CH₃ | 160 |

EXAMPLE 48

Myzus test (contact action)
Solvent: 3 parts by weight dimethyl formamide
Emulsifier: 1 part by weight alkylaryl polyglycol ether To produce a suitable preparation of active compound, 1 part by weight of the active compund is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaulation times and the results can be seen from the following Table.

TABLE 2.—PLANT-DAMAGING INSECTS

Myzus test

| Active compounds | | Concentration of active compound in percent | Degree of destruction in percent after 1 day |
|---|---|---|---|
| 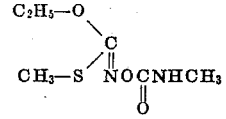 (known) | (A) | 0.2<br>0.02<br>0.002 | 95<br>20<br>0 |
| 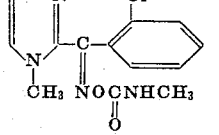 | (11) | 0.2<br>0.02 | 100<br>80 |
| 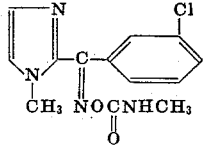 | (12) | 0.2<br>0.02 | 100<br>40 |
| 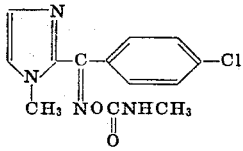 | (1) | 0.2<br>0.02<br>0.002 | 100<br>99<br>50 |
| 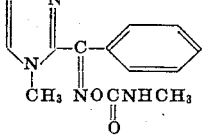 | (7) | 0.2<br>0.02 | 100<br>99 |
| 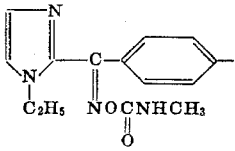 | (21) | 0.2<br>0.02 | 100<br>99 |
| 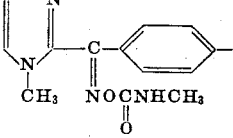 | (2) | 0.2<br>0.02 | 100<br>80 |
| 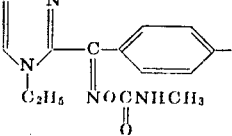 | (18) | 0.2<br>0.02 | 100<br>40 |
| 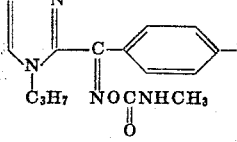 | (19) | 0.2<br>0.02 | 100<br>50 |

| Active compounds | | Concentration of active compound in percent | Degree of destruction in percent after 1 day |
|---|---|---|---|
| 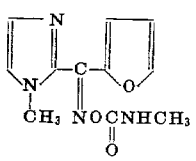 | (3) | 0.2<br>0.02<br>0.002 | 100<br>100<br>50 |
| 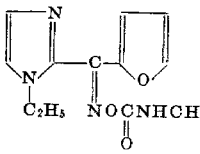 | (33) | 0.2<br>0.02 | 100<br>50 |
| 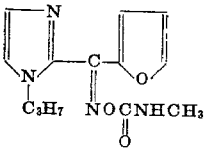 | (5) | 0.2<br>0.02 | 100<br>60 |

EXAMPLE 49

Phaedon larvae test

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100 percent means that all the beetle larvae are killed. 0 percent means that none of the beetle larvae are killed.

The active compounds, the concentration of the active compound, the times of evaluation and the results can be seen from the following Table.

TABLE 3.—PLANT-DAMAGING INSECTS

Phaedon larvae test

| Active compounds | | Concentration of active compound in percent | Degree of destruction in percent after 3 days |
|---|---|---|---|
| 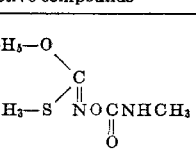 (known) | (A) | 0.2<br>0.02<br>0.002 | 100<br>45<br>0 |
| 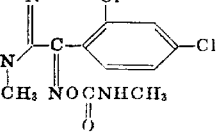 | (16) | 0.2<br>0.02 | 100<br>90 |
| 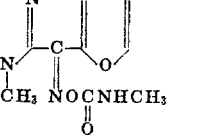 | (3) | 0.2<br>0.02<br>0.002 | 100<br>100<br>70 |

TABLE 3.—PLANT-DAMAGING INSECTS

Phaedon larvae test

| Active compounds | Concentration of active compound in percent | Degree of destruction in percent after 3 days |
|---|---|---|
| (5) <br> [imidazole-C(=NOCNHCH$_3$(=O))-furyl, C$_3$H$_7$ on N] | 0.2 <br> 0.02 | 100 <br> 85 |
| (2) <br> [imidazole-C(=NOCNHCH$_3$(=O))-C$_6$H$_4$-NO$_2$, CH$_3$ on N] | 0.2 <br> 0.02 | 100 <br> 100 |

EXAMPLE 50

Myzus resistant test (contact action)
Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from the following Table.

TABLE 4.—PLANT-DAMAGING INSECTS

Myzus persicae/resistant

| Active compounds | Concentration of active compound in percent | Degree of destruction in percent after 1 day |
|---|---|---|
| C$_2$H$_5$O\C(=NOCNHCH$_3$(=O))/S-CH$_3$ (A) (known) | 0.1 <br> 0.02 <br> 0.004 | 70 <br> 25 <br> 15 |
| imidazole-C(=NOCNHCH$_3$(=O))-C$_6$H$_4$-Cl, CH$_3$ on N (1) | 0.1 <br> 0.02 <br> 0.004 | 95 <br> 95 <br> 50 |
| imidazole-C(=NOCNHCH$_3$(=O))-furyl, CH$_3$ on N (3) | 0.1 <br> 0.02 <br> 0.004 | 100 <br> 100 <br> 78 |

EXAMPLE 51

Phorodon test (contact action)
Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

Hop plants (*Humulus lupulus*) which have been heavily infested with the hop aphid (*Phorodon humuli*) are sprayed with the preparation of the active compound until dripping wet.

After the specified periods of time, the degree of destruction is determined as a percentage: 100 percent means that all the aphids were killed; 0 percent means that none of the aphids were killed.

The active compounds, the concentrations of the active compounds, the evaluation times and the results can be seen from the following Table.

TABLE 5.—PLANT-DAMAGING INSECTS

Phorodon humuli test

| Active compounds | Concentration of active compound in percent | Degree of destruction in percent after 1 day |
|---|---|---|
| C$_2$H$_5$O\C(=NOCNHCH$_3$(=O))/S-CH$_3$ (A) (known) | 0.02 <br> 0.004 <br> 0.0008 <br> 0.00016 | 99 <br> 90 <br> 50 <br> 10 |
| imidazole-C(=NOCNHCH$_3$(=O))-C$_6$H$_4$-Cl, CH$_3$ on N (1) | 0.02 <br> 0.004 <br> 0.0008 <br> 0.00016 | 100 <br> 100 <br> 98 <br> 95 |
| imidazole-C(=NOCNHCH$_3$(=O))-furyl, CH$_3$ on N (3) | 0.02 <br> 0.004 <br> 0.0008 <br> 0.00016 | 100 <br> 100 <br> 98 <br> 98 |

It will be appreciated that the instant specification and examples are set forth by way of illustration and not limitation, and that various modifications and changes may be made without departing from the spirit and scope of the present invention.

What is claimed is:

1. An imidazolyl-ketoxime-carbamate of the formula

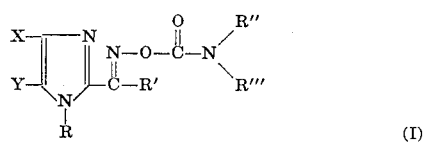

(I)

in which
X and Y each independently is hydrogen, methyl, ethyl or together constitute a fused benzene ring with the two imidazole ring carbon atoms to which they are attached, R is alkyl or alkenyl of up to six carbon atoms, phenyl or benzyl, R' is furyl, thienyl, phenyl or phenyl monosubstituted with nitro, methyl, phenyl, or mono- or di-halogen-substituted, R'' is alkyl of up to six carbon atoms, phenyl, or phenyl substituted by 1 or 2 halogen atoms, and R''' is hydrogen or alkyl of up to four carbon atoms.

2. Compound according to claim 1, in which R is alkyl or alkenyl or up to four carbon atoms.

3. The compound according to claim 1 wherein such compound is [0-(N-methylcarbamoyl)]-[2'-(1'-methylimidazolyl)]-4-chlorophenyl-ketoxime of the formula

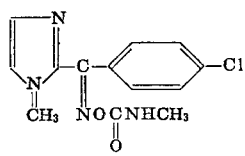

(1)

4. The compound according to claim 1 wherein such compound is [0-(N-methylcarbamoyl)]-[2'-(1'-methylimidazolyl)]-4-nitrophenyl-ketoxime of the formula

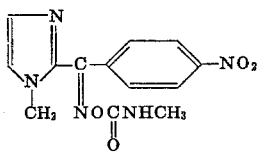

(2)

5. The compound according to claim 1 wherein such compound is [0-(N-methylcarbamoyl)]-[-2'-(1'-methylimidazolyl)]-2-furyl ketoxime of the formula

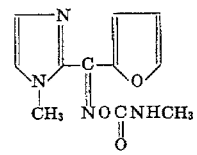

(3)

6. The compound according to claim 1 wherein such compound is [0-(N-methylcarbamoyl)]-[2'-(1'-methylimidazolyl)]-phenyl-ketoxime of the formula

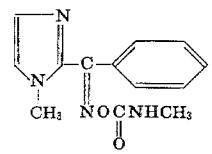

(7)

7. The compound according to claim 1 wherein such compound is [0-(N-methylcarbamoyl)]-[2'-(1'-ethylimidazolyl]-4-chlorophenyl-ketoxime of the formula

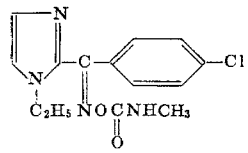

(21)

* * * * *

PO-1050
(5/69)

UNITED STATES PATENT OFFICE
CERTIFICATE OF CORRECTION

Patent No. 3,818,029         Dated  June 18, 1974

Inventor(s)  ERIK REGEL ET AL.

It is certified that error appears in the above-identified patent and that said Letters Patent are hereby corrected as shown below:

Col. 3, at line 20, insert -- [2'-(1'-methylimidazolyl)]-

2-chlorophenylketoxime --.

Col. 4, line 63, correct spelling of "Rhopalosiphum"

Col. 7, line 53, correct spelling of "vaporizing"

Col. 15, lines 46 and 47, between Compounds (7) and (21), cancel "PAT NO 3818029     F. 370
            PAT NO 3818029     F. 371".

Signed and sealed this 8th day of October 1974.

(SEAL)
Attest:

McCOY M. GIBSON JR.
Attesting Officer

C. MARSHALL DANN
Commissioner of Patents